US006330332B1

(12) United States Patent
Itoh et al.

(10) Patent No.: US 6,330,332 B1
(45) Date of Patent: *Dec. 11, 2001

(54) PRIME NUMBER GENERATION APPARATUS B-SMOOTHNESS JUDGEMENT APPARATUS AND COMPUTER MEMORY PRODUCT

(75) Inventors: Koichi Itoh; Kazuhiro Yokoyama; Naoya Torii; Masahiko Takenaka, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,853

(22) Filed: Mar. 10, 1998

(30) Foreign Application Priority Data

Jul. 30, 1997 (JP) .................................................. 9-205074

(51) Int. Cl.⁷ .................................................... H04L 9/00
(52) U.S. Cl. ................................ 380/28; 380/30; 380/44; 380/1
(58) Field of Search .................................. 380/28, 1, 44, 380/30

(56) References Cited

U.S. PATENT DOCUMENTS 4,351,982 * 9/1982 Miller et al. ...................... 178/22.11
4,633,036 * 12/1986 Hellman et al. ................... 178/22.11

FOREIGN PATENT DOCUMENTS 9-73269    3/1997 (JP) .

OTHER PUBLICATIONS

"Cryptographic Theory", "Specific integer factorization method is effective to certain kinds of integer. For instance, p−1 method and p+1 method are effective to the case where p−1 and p+1 do not respectively have a large factor", Oct. 1, 1996, p. 168, lines 5–6.

"Fast Generation of Prime Numbers and Secure Public–Key Cryptographic Parameters", Nov. 14, 1994, pp. 26 and 27, Maurer.

"Faster generation of secure RSA–moduli with almost maximal diversity, Advances in Cryptology–Eurocrypt '89, Lecture Notes in Computer Science",Mar., 1993, Maurer.

Menezes et al, Handbook of Applied Cryptography, Chapter 4, p. 133–154, 1996.*

Maurer, "Fast Generation of Secure RSA–Moduli with Almost Maximal Diversity", Advances in Cryptology–Eurocrypt '89, Lecture Notes in Computer Science, Mar. 1993.*

The Prime Pages, "Finding Primes and Proving Primality", http://www.utm.edu/research/primes/prove/prove3.htm [internet] Jan. 2000.*

Maurer, "Fast Generation of Prime Numbers and Secure Public–Key Cryptographic Parameters", Journal of Cryptology, Nov. 1994.*

\* cited by examiner

Primary Examiner—Albert Decady
Assistant Examiner—Steve Kabakoff
(74) Attorney, Agent, or Firm—Staas & Halsey LLP

(57) ABSTRACT

One or a plurality of prime numbers $p_i$ which are generated and a generated random number are used to calculate a larger prime number candidate, and a judgment is made as to whether or not the prime number candidate is a prime number by using a provable prime number judging method, and when the judgment is made that the candidate is a prime number, the prime number p is outputted. As for at least three polynomials F(p) which are factors of $p^s-1$ (s: arbitrary natural number) by a prime number p, a measure against prime factorization is taken. Moreover, when the prime number p is used for a secret key of RSA cryptosystem, a strong prime number p against the iterated-encryption attack on RSA cryptosystem is generated.

21 Claims, 11 Drawing Sheets

PRIME NUMBER GENERATION APPARATUS B-SMOOTHNESS JUDGEMENT APPARATUS AND COMPUTER MEMORY PRODUCT

BACKGROUND OF THE INVENTION

1. Field of the Invention

The present invention relates to a prime number generation apparatus for generating prime numbers to be strong public keys in cipher communication, for example, and relates to a B-smoothness judgment apparatus.

2. Description of the Prior Art

In cryptosystem such as a RSA cryptosystem whose security is based on the difficulty of factoring, it is difficult due to computational complexity to obtain prime factors p and q which satisfies n=pq (n is public) in the case where n is about 1024 bits. Moreover, it is a condition of security in cryptography that an attacker cannot obtain p and q from n. Therefore, the security in the cipher communication depends on the quality of the prime numbers p and q to be generated (whether or not they are easily solved into prime factors).

In a conventional method, since prime numbers are generated by using the probable primality test method such as Miller-Rabin, composite numbers which are not prime numbers may be possibly generated in very low probability.

According to "Cryptographic Theory" (written by Eiji Okamoto, published by Kyoritsu Shuppan), etc., in the case where with respect to the prime number p, p−1 or p+1 is the product of only small prime numbers, n can be solved into prime factors comparatively easily by prime factorization algorithm such as a p−1 method or p+1 method. Therefore, in the conventional prime number generating method, a measure is taken to cope with the prime factorization in such a manner that large prime factors $p_1$ and $p_2$ are given respectively to p−1 and p+1.

Further, the encryption is repeated u-times so that a cipher text $X^e$ (X: plain text, e: encryption key) of RSA cryptosystem is encrypted into $X^e$, $(X^e)^e$, $((X^e)^e)^e$, . . . , and thus a plain text X is obtained as represented by the following equation (1). This attack, namely, iterated encryption attack is known. In the conventional prime number generating method, a measure is taken to cope with such an attack in such a manner that a large prime number $p_1'$ is included in $p_1-1$ as for a large prime factor $p_1$ included in p−1.

$$X^{e^u} \equiv X \pmod{n} \tag{1}$$

In addition, as a concrete conventional example of the prime number generating method, the following method is known. U.S. Pat. No. 4,633,036 discloses a probable prime number generating method in which p−1 and p+1 respectively include large prime numbers $p_1$ and $p_2$, $p_1-1$ and $p_2-1$ respectively include large prime numbers $p_1'$ and $p_2'$, and a total bit lengths of $p_1$ and $p_2$ cannot exceed a bit length of p. Moreover, Japanese Patent Application Laid-Open 0-73269 (1997) discloses a probable prime number generating method in which p−1 and p+1 respectively include large prime numbers $p_1$ and $p_2$, $p_1-1$ includes a large prime number $p_1'$ and bit lengths of $p_1$ and $p_2$ exceed ½ of the bit length of p.

The conventional prime number generating method has the following problems which is to be solved by the present invention.

(Problem 1) In the conventional prime number generating method, a composite number is generated in very low probability.

(Problem 2) In the conventional method, p−1 and p+1 include large prime numbers, but besides that it is known that in the case where one of the polynomial F (p) which is a factor of $p^s-1$ (s: arbitrary integer) such as $p^2+p+1$, $p^2-p+1$, . . . is composed of the product of only small prime numbers, the prime factors can be solved comparatively easily. Here, a number composed of the product of prime numbers not larger than integer B is called B-smooth. In other words, that F(p) is not B-smooth with respect to a small B is a measure to cope with the prime factorization utilizing F(p). However, in the conventional method, since what integer B in t-polynomial F(p) becomes B-smooth is not considered, there is such a problem that a maximum order of F(p) to which a measure is taken is not found. In order to check as to whether or not F(p) is B-smooth, F(p) is practically divided by a prime number not larger than B many times, but in the case where a judgment is made whether or not a certain F(p) is B-smooth, when B is large, prime number data become enormous and thus a lot of time is required. Namely, it takes time to judge whether or not F(p) is B-smooth, and it is very difficult to factorize an arbitrary F(p) into prime factor as long as a maximum order of F(p) to which a measure is taken is not found. Because of these, in the conventional method, the measure of the prime factorization is taken to F(p)=p−1, p+1, but the measure is not taken to F(p) of the second order or higher.

(Problem 3) In the conventional prime number generating method, as for a measure against iterated-encryption attack, a method in which a large prime number p" is included in p'−1 as to a prime number p' included in p−1 is used. In this measure against the iterated-encryption attack, generation of a very weak key can be avoided, but there is a possibility that attack will be successful.

As an effective measure against the iterated-encryption attack which is conventionally known, there is the Maurer judging method (Fast generation of secure RSA-moduli with almost maximal diversity, Advances in Cryptology-EUROCRYPT '89, Lecture Notes in Computer Science, Vol.434, pp.636–647). The following simply describes the Maurer judging method.

Maurer Judging Method

As for a prime number p, the following conditions (2) are satisfied.

$$p = 2h_p p' + 1 (p' > h_p, p': \text{prime number})$$

and $$p' = 2h_{p'} p'' + 1 (p'' > h_{p'}, p'': \text{prime number}) \tag{2}$$

In the case where p and q which satisfy these two conditions are used for secret keys of RSA and an encryption key of RSA is e, when the following condition (3) is satisfied, it is assured that the probability f that a number of repetition u of encryption required for obtaining a plain text X from a cipher text $X^e$ satisfies the following condition (4) (with respect to the plain text X) is as the following condition (5).

$$e^{p'-1} \equiv 1 \pmod{p'} \text{ and } \pmod{q'}$$

$$e^{(p'-1)/p''} \not\equiv 1 \pmod{p'} \text{ and } \pmod{q'} \tag{3}$$

e is a primitive element in (mod p') and (mod q')

$$u \geq \min(p'-1, q'-1) \tag{4}$$

$$f \geq 1 - 1/(p'q') \tag{5}$$

More specifically, in the case where n=1024 bits, p=q= 512 bits and p'=q'=260 bits, it is assured that unless encryption is not repeated at least $2^{260}$ times for all the plain texts except for $2^{504}\{=2^{1024}\div(2^{260}\times2^{260})\}$ plain texts in the universal set of $2^{1024}$ plain texts, the original text cannot be obtained.

In the Maurer judging method, since the Pocklington provable prime number judging method, to be mentioned later, is carried out on a basis of the encryption key e of RSA, the Maurer judging method is a measure against the iterated-encryption attack and at the same time is a method for performing a provable prime number judgement.

BRIEF SUMMARY OF THE INVENTION

It is one object of the present invention to provide a prime number generation apparatus which is capable of generating provable prime numbers.

It is another object of the present invention to provide a prime number generation apparatus which is capable of determining an upper limit of an order to which a measure against the prime factorization is necessary to be taken and of taking a suitable measure against the prime factorization.

It is still another object of the present invention to provide a prime number generation apparatus which is capable of generating strong prime numbers against iterated-encryption attack.

The prime number generation apparatus of the present invention has a prime number generator, a random number generator and a provable prime number judging unit. One or a plurality of prime numbers $p_i$ generated by the prime number generator and a random number generated by the random number generator are used to calculate a larger prime number candidate, and a judgment is made as to whether or not the prime number candidate is a prime number by the prime number judging unit using the provable factor judging method, and when the judgment is made that the candidate is a prime number, the prime number p is outputted. As for at least three polynomials F(p) which are factors of $p^s-1$ (s: arbitrary natural number) by the prime number p, a measure against the prime factorization is taken. Moreover, when the prime number p is used for a secret key of RSA cryptosystem, a stronger prime number p against the iterated-encryption attack on RSA cryptosystem is generated.

As mentioned above, in the prime number generation apparatus of the present invention, a provable prime number can be generated, and a suitable measure against the prime factorization can be taken, and when the prime number generated by the prime number generation apparatus of the present invention is used for a secret key of RSA cryptosystem, a strong prime number against the iterated-encryption attack can be generated.

The above and further objects and features of the invention will more fully be apparent from the following detailed description with accompanying drawings.

DETAILED DESCRIPTION OF THE INVENTION

First, a description will be given as to the principle of the present invention.

The present invention solves the aforementioned problems by using the following means.

(Means 1) With respect to (Problem 1), the Pocklington provable prime number judging method is used as a prime number judging method so that a prime number can be surely generated.

(Means 2) With respect to (Problem 2), the criterion as to whether or not a t-order polynomial F(p) is B-smooth is introduced, and when $t_{max}$ with which it can be judged that F(p) cannot be B-smooth if the order of F(p) is not less than $t_{max}$-order, is determined, an order of the polynomial to which a measure against the prime factorization is taken can be limited.

(Means 3) With respect to (Problem 3), by adding a specific process, to be mentioned later, at the time of generating prime numbers, a prime number which is strong against the iterated-encryption attack can be generated.

Figure 1:
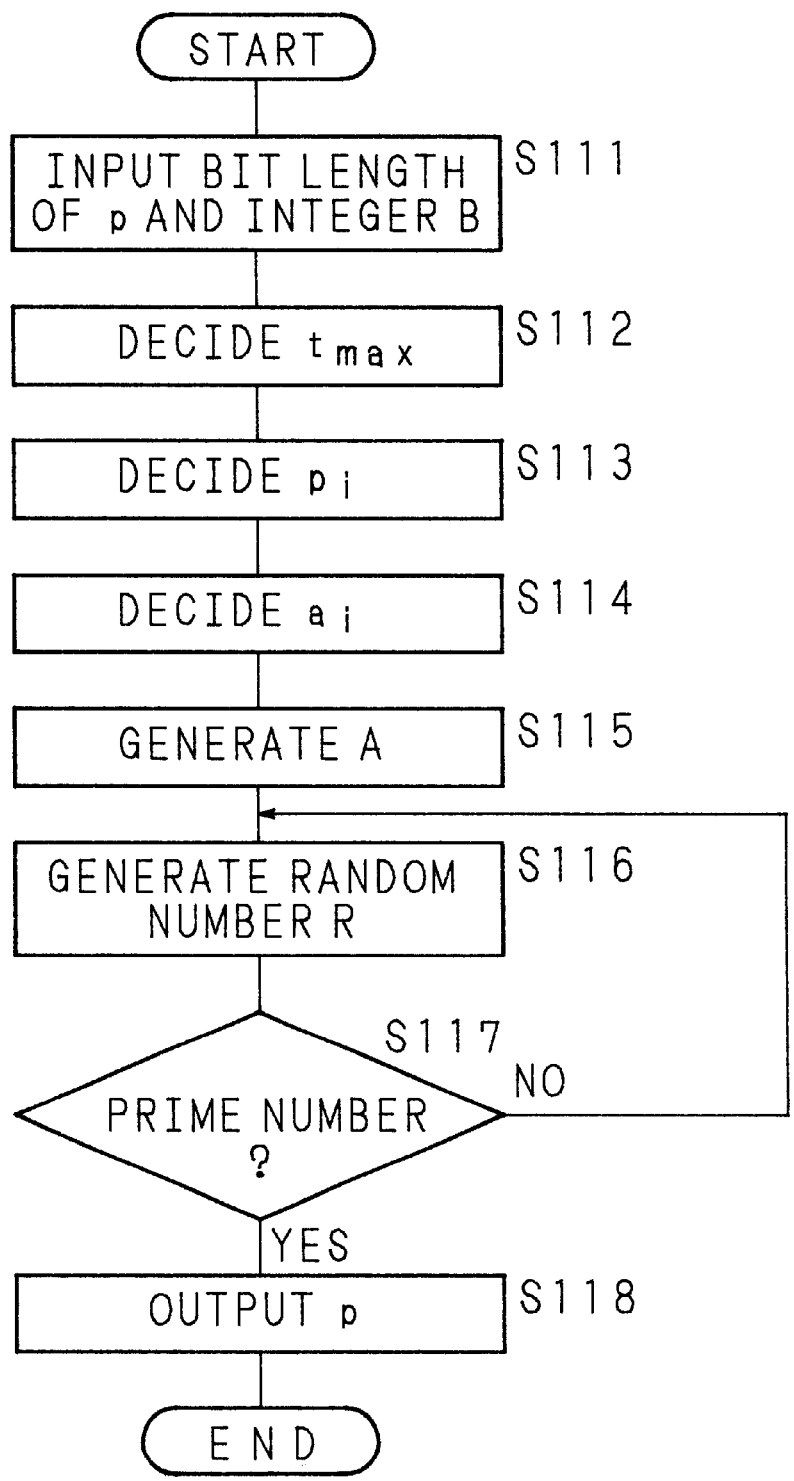
FIG. 1 is a flow chart showing a whole flow of prime number generation.

FIG. 1 is a flow chart showing a whole flow of prime number generation in the present invention, and the prime number generating process is executed according to the following procedure.

S111: First, a bit length of a prime number p to be generated and an integer B for judging whether or not F(p) is B-smooth are inputted.

S112: An order $t_{max}$ of F(p), with which it can be judged that F(p) cannot be B-smooth if the order of F(p) is not less than this order, is obtained.

S113: A prime number $p_i$ given to F(p) of less than $t_{max}$ order ($1 \leq i \leq f$, f: the number of polynomials F(p) whose order is not less than $t_{max}$-order) is determined.

S114: $a_i$ which satisfies $F(a_i) \equiv 0 \pmod{p_i}$ is obtained.

S115: A $(\bmod\ p_1 \ldots p_f)$ which satisfies $A \equiv a_i \pmod{p_i}$ is generated.

S116: A random number R is generated by a random number generator. S117 and S118: $p = Rp_1 \ldots p_f + A = 2h_p p_1 + 1$ is subject to the Pocklington prime number judging method. As a result, if the judgment is made that it is a prime number, p is outputted and the sequence is ended. If not, the sequence returns to S116.

Next, the description will be given as to detailed contents of (Means 1), (Means 2) and (Means 3).

(Means 1)

In the present invention, when the prime number judgment, the following Pocklington provable prime number judging method is used.

Pocklington Provable Prime Number Judging Method

Figure 2:
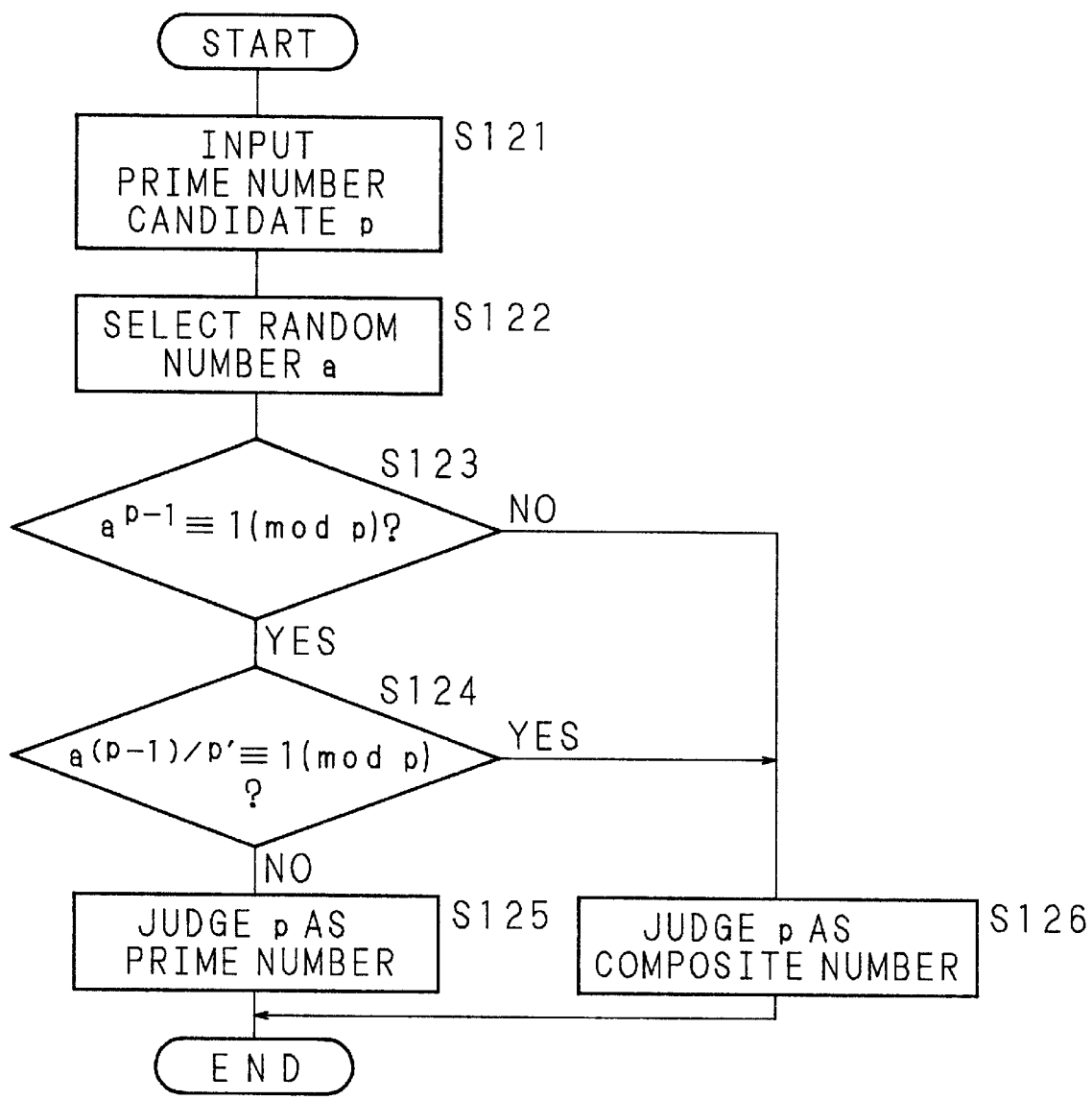
FIG. 2 is a flow chart showing a procedure of a Pocklington provable prime number judging method.

FIG. 2 is a flow chart showing a procedure of the Pocklington provable prime number judging method, and prime numbers are judged according to the following procedure.

S121: Prime number candidate $p=2h_p p'+1$ to be judged is inputted. Here, p' is a prime number and $p'>h_p$.

S122: A random number a is selected.

S123 and S126: $a^{p-1} \equiv 1 \pmod{p}$ is judged. If YES, the sequence goes to S124, and if NO, p is judged as a composite number and the sequence is ended.

S124, S125 and S126: The following condition (6) is judged. If YES, p is judged as a prime number and the sequence is ended. If NO, p is judged as a composite number and the sequence is ended.

$$a^{(p-1)/p'} 1 \pmod{p} \tag{6}$$

As mentioned above, since a larger prime number p can be generated from the prime number p', the larger prime number p can be generated from a database of smaller prime numbers. Therefore, it is found that this judging method can be utilized for generating a provable prime number.

(Means 2)

In the present invention, in order to take a measure against the prime factorization using the t-order polynomial F(p) which is a factor of $(p^s-1)$, the criterion as to whether or not F(p) is B-smooth is introduced. This criterion is such that when a bit length of a prime number to be generated is $p_b$, as to an arbitrary prime number p of $p_b$ bit, the probability that F(p) becomes B-smooth is not more than $1/p^{1/2}$.

In addition, the determination of the probability that F(p) becomes B-smooth is made according to the following procedures ① through ③.

① A range $[F(p_{min}), F(p_{max})]$ sandwiched between a maximum value and minimum value of the t-order polynomial F(p) is considered. Here, $p_{max}$ and $p_{min}$ are respectively maximum and minimum prime numbers of the $p_b$ bit.

② A number of integers which satisfy B-smooth and are included in the range $[F(p_{min}), F(p_{max})]$ is calculated. This is approximated by $(F(p_{max})-F(p_{min})) \cdot \exp(-u \ln u)$. Here, $u=t \times p_b/\log_2 B$, and ln represents a natural logarithm.

③ The number calculated at ② is divided by $(F(p_{max})-F(p_{min}))$, and thus the probability $\exp(-u \ln u)$ that an integer existing in $[F(p_{min}), F(p_{max})]$ is B-smooth is calculated.

Here, the description will be given as to the reason that a number of integers satisfying B-smooth included in $[F(P_{min}), F(p_{max})]$ is approximated by $(F(p_{max})-F(p_{min})) \cdot \exp(-u \ln u)$ at ②. It is known that a number of integers less than x not having a prime factor exceeding y is approximated by $\Phi(x,y)=x \cdot \exp(-u \ln u)$. Here, $u=(\ln x)/(\ln y)$. Namely, $\Phi(F(p_{max}), B)-\Phi(F(p_{min}), B)$ represents the number of integers satisfying B-smooth existing the range $[F(p_{min}), F(p_{max})]$. Moreover, as to $u=(\ln F(p))/(\ln B)$, $p_{min}$ and $p_{max}$ have the same bit length, so the same approximation can be given to u in $[p_{min}, p_{max}]$. Therefore, $\Phi(F(p_{max}), B)-\Phi(F(p_{min}), B)=(F(p_{max})-F(p_{min})) \cdot \exp(-u \ln u)$ represents a number of integers satisfying B-smooth in the interval $[F(p_{min}), F(p_{max})]$.

According to ① through ③, $\exp(-u \ln u)$ calculates the probability in which F(p) satisfies B-smooth, and when this value is $1/p^{1/2}$ or less, the judgment is made that F(p) cannot be B-smooth in actual probability, and if the value is not $1/p^{1/2}$ or less, the judgment is made that F(p) can be B-smooth. In such a manner, the evaluation is made as to whether or not the t-order polynomial F(p) is B-smooth. As a result, the order $t_{max}$ of the polynomial which cannot be B-smooth is determined, and a larger prime number is given to the F(p) whose order is less than $t_{max}$ which can be B-smooth. When the judgment is made that F(p) whose order is not less than $t_{max}$ cannot be B-smooth, a measure against the prime factorization using a polynomial of an arbitrary factor in $(p^s-1)$ except for p-1/p+1 method is also taken.

(Means 3)

In the present invention, when one of the following processes (Means 3a) and (Means 3b) is added to the aforementioned prime number generating method at S111 through S118, a strong prime number against the iterated-encryption attack is generated. First, before the contents of the (Means 3a) and (Means 3b) are described, a necessary theorem and complement theme are described.

[Theorem] Euler's Theorem

As to arbitrary primes a and n, the following condition (7) holds. Here, $\phi(n)$ is an Euler's function, and when n is solved into prime factors as shown in (8) below, this is represented by the following equation (9).

$$a^{\phi(n)} \equiv 1 \pmod{n} \tag{7}$$

$$n = p_1^{S1} p_2^{S2} \ldots p_r^{Sr} \tag{8}(p_i: \text{prime number})$$

$$\phi(n) = (p_1-1)(p_2-1) \ldots (p_r-1) p_1^{S1-1} p_2^{S2-1} \ldots p_r^{Sr-1} \tag{9}$$

In addition, as to a maximum prime number u which satisfies $a^u \equiv 1 \pmod{n}$, $u|\phi(n)$ holds. Here, a|b means that b can be divided by a.

When $X^k \equiv 1 \pmod{p_1^{S1} p_2^{S2} \ldots p_r^{Sr}}$, a number of solutions of X is $\pi^r_{i=1} v_i$.

Here, $v_i = \gcd(k, \phi(p_i^{Si}))$.

Particularly, when $d=\gcd(k, \phi(p_i^{Si}))$, a solution of X which satisfies $X^k \equiv 1 \pmod{p_i^{Si}}$ coincides with a solution of $X^d \equiv 1 \pmod{p_i^{Si}}$, and its number is d.

(Means 3a)

Figure 3:
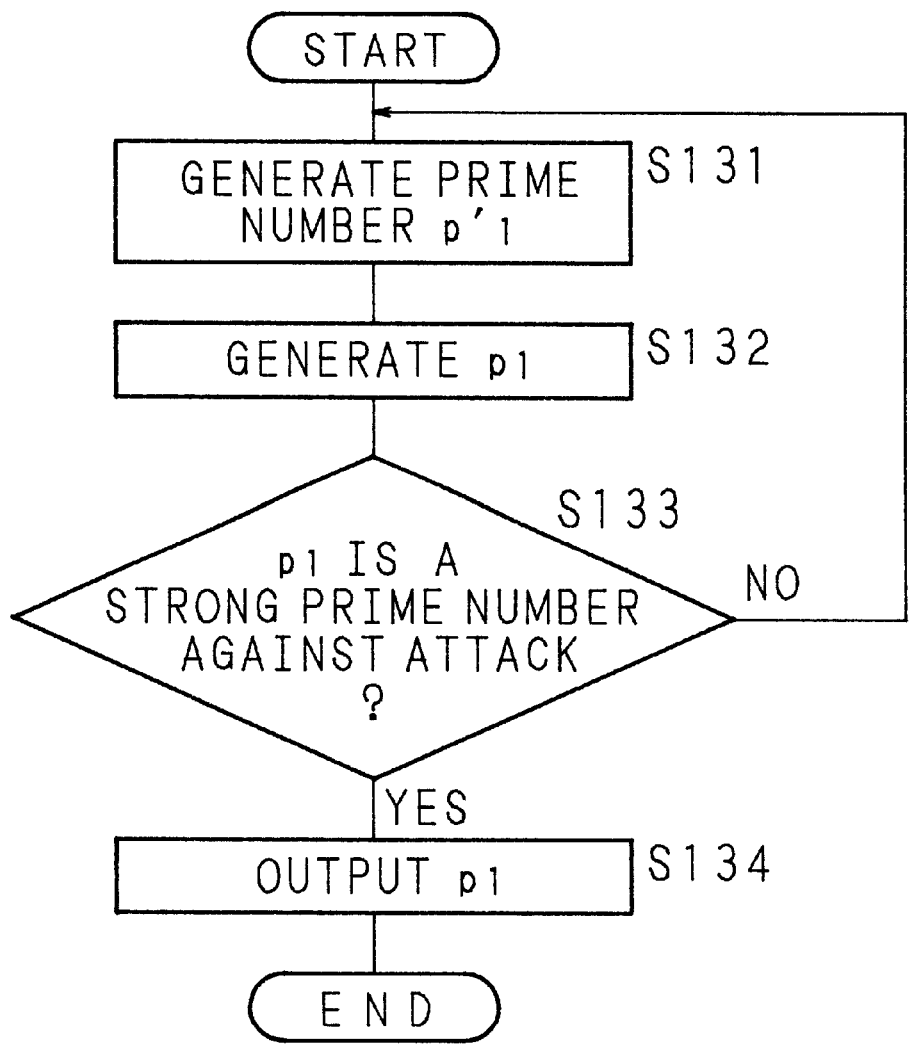
FIG. 3 is a flow chart showing a procedure for generating strong prime numbers against iterated-encryption attack.

FIG. 3 is a flow chart showing a procedure in (Means 3a), and a prime number $p_1$ included in p-1 at aforementioned S113 is generated.

S131: A prime number $p_1'$ is generated by the prime number generator using the Pocklington judging method.

S132: $p_1 = 2p_1' + 1$ is generated from $p_1'$.

S133 and S134: the Maurer judgment is made by using $p_1'$ and e. As a result, when $p_1$ uses e as an encryption key of RSA, the judgment is made as to whether or not $p_1$ is a strong prime number against the iterated-encryption attack, and when the judgment is made that $p_1$ is a strong prime number, $p_1$ is outputted and the sequence is ended. If the $p_1$ is not a strong prime number, the sequence returns to S131.

The description will be given as to the reason that in the case where such a method (Means 3a) is added to the generation of prime numbers, a strong prime number against the iterated-encryption attack than the conventional method can be generated.

First, the description will be given as to the safety in the case where $p_1=2h_p' p_1'+1$ and $p_1$ is subject to the Maurer judging method, and thereafter a prime number $p=2h_p p_1+1$ is generated. The iterated-encryption attack is attack for encrypting a plain text X u times and obtaining a plain text, and it is represented by the following equation (10).

$$X^{e^u} \equiv X \pmod{n} \tag{10}$$

Namely, $X^{e^u-1} \equiv 1 \pmod{n}$.

Particularly, when $e^u-1 \equiv 0 \pmod{\phi(n)}$ holds as to a small u, the above equation (10) is satisfied as to arbitrary X according to the [Theorem]. Such a situation should be avoided. Namely, the probability that $e^u \equiv 1 (\mathrm{mod}\ \phi(n))$ which is determined by e, u and n is satisfied in the case where u is small should be reduced.

First, according to $n=pq$, $p=2h_p p_1+1$ and $q=2h_q q_1+1$, since $\phi(n)=4h_p h_q p_1 q_1$, $e^u \equiv 1\ (\mathrm{mod}\ 4h_p h_q p_1 q_1)$ is considered. In this case, according to the above [Theorem], the condition which is satisfied by u is the following (11).

$$u | \phi(4h_p h_q p_1 q_1) \tag{11}$$

In addition, since $p_1$ and $q_1$ are prime numbers, the following relationship (12) holds, and (11) is represented as (13).

$$\phi(4h_p h_q p_1 q_1) = \phi(p_1)\phi(q_1)\phi(4h_p h_q) = 4\{(p_1-1)/2\}\{(q_1-1)/2\}\phi(4h_p h_q) \tag{12}$$

$$u | 4h_p' h_q' p_1' q_1' \phi(4h_p h_q) \tag{13}$$

Namely, when the following relationship (14) is made to be the product of large prime numbers, a number of u which satisfies the relationship (13) and is a small number is decreased.

$$4h_p' h_q' p_1' q_1' \phi(4h_p h_q) \tag{14}$$

That a number of u which satisfies the relationship (13) and is a small numbers is decreased means that the probability that $e^u - 1 \equiv 0\ (\mathrm{mod}\ \phi(n))$ holds as to a small u is decreased. Therefore, when (Means 3a) is used, since $h_p' = h_q' = 1$ holds in the relationship (14), the probability that $e^u - 1 \equiv 0\ (\mathrm{mod}\ \phi(n))$ holds as to a small u is decreased.

In the present invention using (Means 3a), the prime numbers $p_1'$ and $q_1'$ are generated, and the prime numbers $p_1$ and $q_1$ are generated so that $p_1=2p_1'+1$, $q_1=2q_1'+1$ is satisfied. As a result, the probability that the condition $e^u - 1 \equiv 0\ (\mathrm{mod}\ \phi(n))$ for satisfying the iterated-encryption attack with respect to an arbitrary plain text holds as to a small u is kept low.

(Means 3b)

Figure 4:
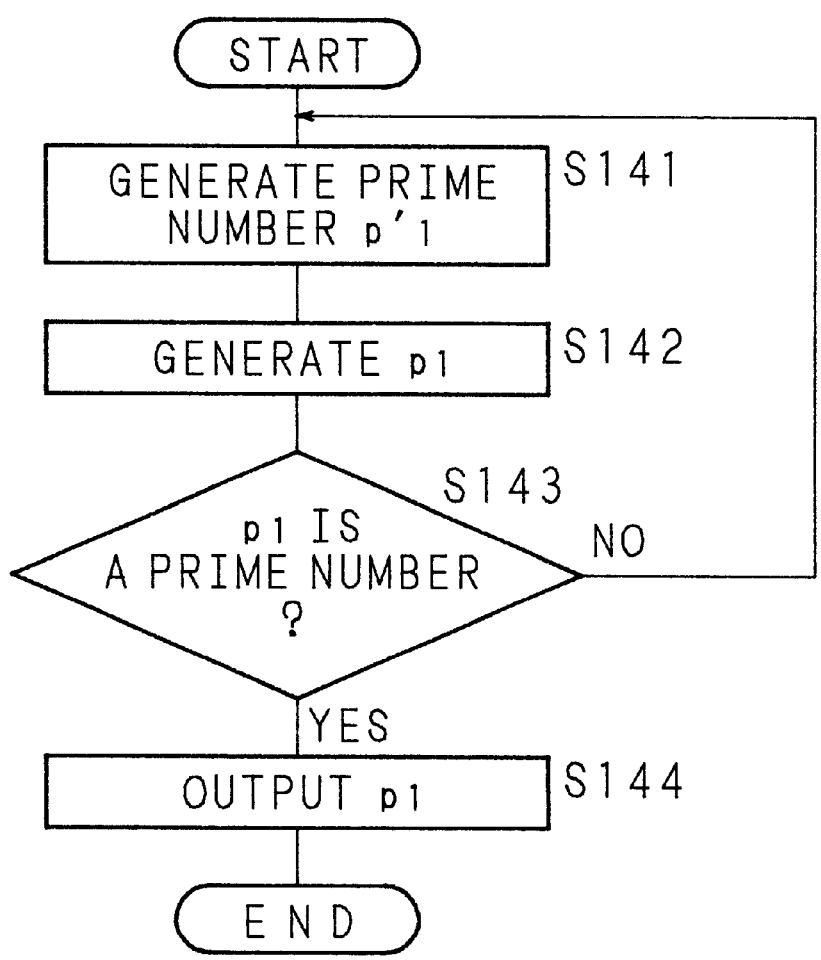
FIG. 4 is a flow chart showing a procedure for generating strong prime numbers against the iterated-encryption attack.

FIG. 4 is a flow chart showing a part of the procedure in (Means 3b), and a prime number $p_1$ included in p−1 at aforementioned S113 is generated according to the following procedure.

S141: A prime number $p_1'$ is generated by the prime number generator using the Pocklington judgment.

S142: $p_1=2p_1'+1$ is generated from $p_1'$.

S143 and S144: $p_1$ is subject to the Pocklington judgment. As a result, when the judgment is made that $p_1$ is a prime number, $p_1$ is outputted and the sequence is ended. When $p_1$ is not a prime number, the sequence returns to S141.

Figure 5:
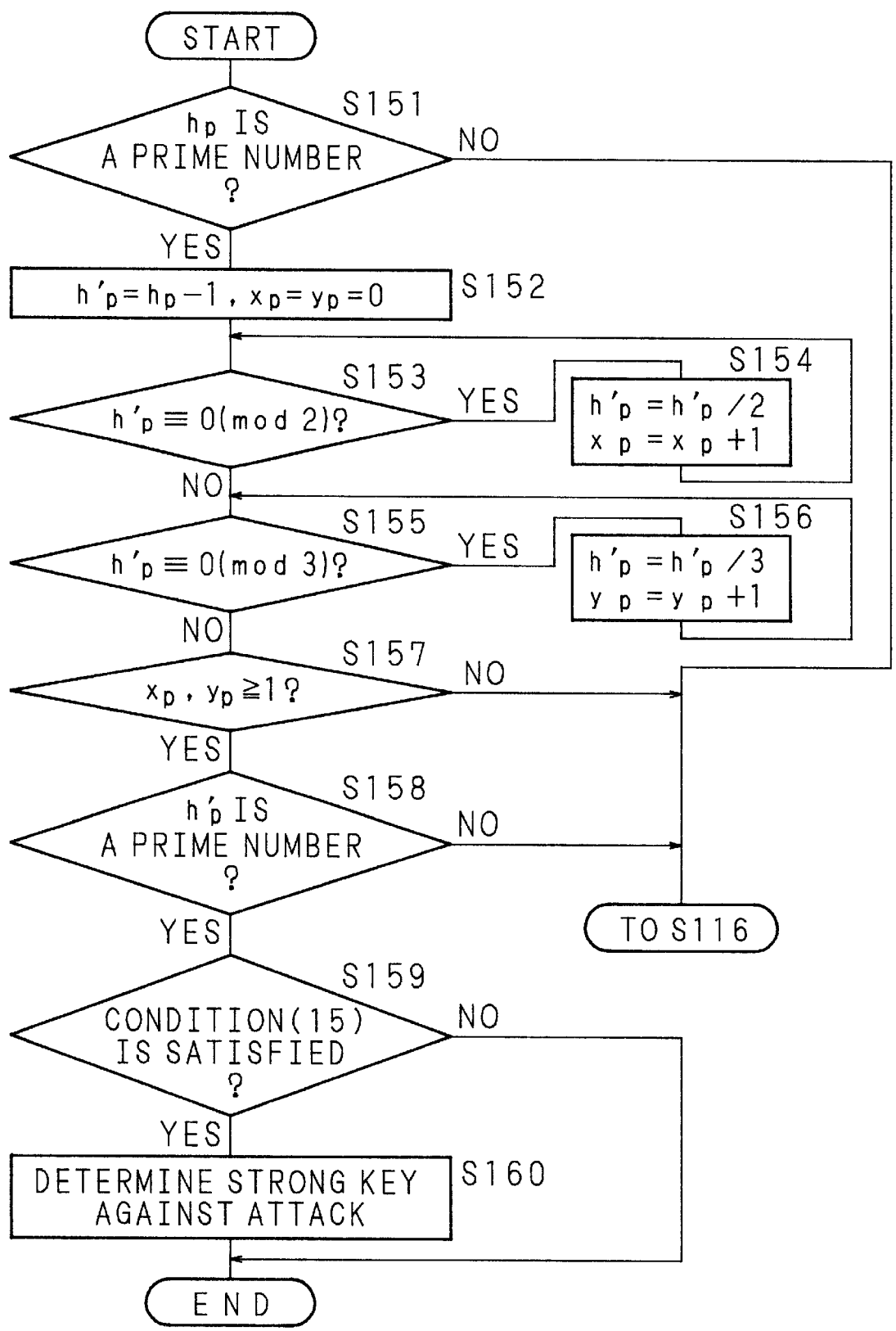
FIG. 5 is a flow chart showing a procedure for generating strong prime numbers against the iterated-encryption attack.

As to A generated at S115 and a random number R generated at S116, $2h_p=\{Rp_2 \ldots p_t+(A-1)/p_1\}$ is calculated, and the following procedures shown in the flow chart of FIG. 5 are added before S117.

S151: $h_p$ is subject to the probable prime number judgment. When the judgment is made that $h_p$ is not a prime number, $h_p$ is judged as to be weak against the attack, and the sequence returns to S116, i.e., the procedure for generating a random number R.

S152: $h_p'=h_p-1$, $x_p=0$ and $y_p=0$

S153 and S154: While $h_p' \equiv 0\ (\mathrm{mod}\ 2)$ is satisfied, $h_p'=h_p'/2$ and $x_p=x_p+1$ are repeated.

S155 and S156: While $h_p' \equiv 0\ (\mathrm{mod}\ 3)$ is satisfied, $h_p'=h_p'/3$ and $y_p=y_p+1$ are repeated.

S157: when $x_p, y_p \geq 1$ is not satisfied, the sequence returns to S116, i.e., the process for generating a random number R.

S158: $h_p'$ is subject to the probable prime number judgment. When the judgment is made that $h_p'$ is not a prime number, $h_p$ and $h_p'$ are judged as to be weak against the attack, and the sequence returns to S116, i.e., the process for generating a random number R.

S159 and S160: in the case where p and q are generated from $p_1$ and $q_1$ generated at S141 through S144 and $h_p$ and $h_q$ which passed the judgments of S151 through S158, and p and q are finally outputted as prime numbers, when the following relationship (15) holds as to the encryption key e of RSA, p, q and e are judged as strong keys against the iterated-encryption attack and the sequence is ended.

$$\gcd(e^{2^{x'}3^{y'}}, (p-1)(q-1)/4)=1,\ (x'=\max(x_p, x_q), y'=\max(y_p, y_q)) \tag{15}$$

Here, when upper limits x' and y' of $x_p$ and $x_q$ and $y_p$ and $y_q$ are obtained previously, the process at S157 is replaced by the following process at S157', and the process S161 is added finally. As a result, the judging process relating to e can be paralleled as to p and q.

S157': When $x_p, y_p \geq 1$, $x_p \leq x'$, $y_p \leq y'$ do not hold, the sequence returns to the process at S116 for generating a random number R.

S161: When the following condition (16) is satisfied as to the encryption key e of RSA, p and e are judged as strong keys against the iterated-encryption attack, and the sequence is ended.

$$\gcd(e^{2^{x'}3^{y'}}, (p-1)/2)=1 \tag{16}$$

In the case where such a method (Means 3b) is added to the prime number generating method, that only four weak plain texts against the iterated-encryption attack exist is shown as follows. First, according to S131 through S133, S141 through S143 and S151, the judging conditions are the following (a) through (e).

(a) $p_1$ is a prime number.
(b) $p'_1$ which satisfies $p_1=2p'_1+1$ is a prime number.
(c) $h_p$ is a prime number.
(d) As to a certain $x_p, y_p \geq 1$, a prime number $h'_p$ which satisfies $h_p=2^{x_p}3^{y_p}h'_p+1$ exists.
(e) $\gcd(e^{2^{x'}3^{y'}}-1, (p-1)(q-1)/4)=1$ Here, $x'=\max(x_p, x_q)$, $y'=\max(y_p, y_q)$ At this time, the number of plain texts X, in which the following condition (17) holds as to small u, is considered. Here, $\gcd(X,pq)=1$.

$$X^{e^u-1} \equiv 1\ (\mathrm{mod}\ pq) \tag{17}$$

The number of X which satisfies the following condition (18) is as the following (case-A) or (case-B).

$$X^{e^u-1} \equiv 1\ (\mathrm{mod}\ n) \tag{18}$$

(case-A) When the following condition (19) is satisfied according to [Theorem], the condition (18) holds as to all Xs.

(case-B) When the following condition (19) is not satisfied according to [Complement Theme], the condition (18) holds as to $v_p v_q$ pieces of Xs. ($v_p=\gcd(e^u-1, \phi(p))$, $v_q=\gcd(e^u-1, \phi(q))$)

$$e^u-1 \equiv 0\ (\mathrm{mod}\ \phi(n)) \tag{19}$$

First, as to (case-A), $\phi(n)=4h_p h_q p_1 q_1$, and the following (20) and (21) are equivalent.

$$e^u \equiv 1\ (\mathrm{mod}\ 4h_p h_q p_1 q_1) \tag{20}$$

$$e^u \equiv 1\ (\mathrm{mod}\ 4)$$

$$e^u \equiv 1\ (\mathrm{mod}\ h_p)$$

$$e^u \equiv 1 \pmod{h_q} \quad (21)$$

$$e^u \equiv 1 \pmod{p_1}$$

$$e^u \equiv 1 \pmod{q_1}$$

The existence of solutions of $e^u \equiv 1 \pmod{z}$ ($z=4, h_p, h_q, p_1$ or $q_1$) in (21) is the condition that a solution of (20) exists. Moreover, to solve each equation in (21) is substantially the same as to solve the equation (22) according to the (Complement Theme). Moreover, according to (23), as to the condition that a solution of (21) exists, a judgment may be made as to whether or not (20) is satisfied as for u which satisfies the following (24).

$$e^{gcd(u,\,\phi(z))} \equiv 1 \pmod{z}(z=4, h_p, h_q, p_1 \text{ or } q_1) \quad (22)$$

$$\phi(4)=2,\ \phi(h_p)=2^{x_p}3^{y_p}h'_p,\ \phi(h_q)=2^{x_q}3^{y_q}h'_q,\ \phi(p_1)=2p'_1,\ \phi(q_1)=2q'_1 \quad (23)$$

$$u \mid \text{lcm}(\phi(4), \phi(h_p), \phi(h_q), \phi(p_1), \phi(q_1))$$

$$u \mid 2^{x'}3^{y'}h'_p h'_q p'_1 q'_1, \ (x'=\max(x_p, x_q),\ y'=\max(y_p, y_q)) \quad (24)$$

In addition, since only the following (25) becomes a small number among u candidates, a judgment may be made as to whether or not the following (26) holds. When (26) holds, the judgment can be made that (case-A) does not hold as to small u.

$$2^{x'}3^{y'} \quad (25)$$

$$e^{2^{x'}3^{y'}} - 1 \equiv 0 \pmod{\phi(n)} \quad (26)$$

Next, as to (case-B), a lot of Xs exist if one of (27) holds, from $\phi(p)=2h_p p_1$, $\phi(q)=2h_q q_1$ and [Complete Theme].

$$e^u - 1 \equiv 0 \pmod{h_p}$$

$$e^u - 1 \equiv 0 \pmod{h_q} \quad (27)$$

$$e^u - 1 \equiv 0 \pmod{p_1}$$

$$e^u - 1 \equiv 0 \pmod{q_1}$$

However, as for the judgment of holding one of (27), a judgment is made as to only small u in (30) among a lot of u which satisfy (28) according to (29).

$$u \mid z'(z'=\phi(h_p), \phi(h_q), \phi(p_1) \text{ or } \phi(q_1)) \quad (28)$$

$$\phi(h_p)=2^{x_p}3^{y_p}h'_p,\ \phi(h_q)=2^{x_q}3^{y_q}h'_q,\ \phi(p_1)=2p'_1,\ \phi(q_1)=2q'_1 \quad (29)$$

$$u=2^{x'}3^{y'} \quad (30)$$

Namely, the following (31) may hold as to $z=h_p, h_q, p_1$ and $q_1$. Therefore, the judging condition is the following (32) since all z are prime numbers.

$$e^{2^{x'}3^{y'}} - 1 \equiv 0 \pmod{z}(z=h'_p, h'_q, p_1 \text{ and } q_1) \quad (31)$$

$$\gcd(e^{2^{x'}3^{y'}}-1, h'_p h'_q p_1 q_1)=1 \quad (32)$$

When (32) holds, the aforementioned (27) does not hold. Namely, X does not have many solutions as to small u.

Therefore, when the condition of (Means 3b) is satisfied, and the following (33), in which the conditions of (26) and (32) are synthesized considering $h_p p_1=(p-1)/2, h_q q_1=(q-1)/2$, is satisfied, $v_p=\gcd(e^u-1, \phi(p))=2$ and $v_q=\gcd(e^u-1, \phi(q))=2$ in (case-B), and thus the following (34) does not hold as to small u except for four plain texts $X=v_p \times v_q$.

$$\gcd(e^{2^{x'}3^{y'}}-1, (p-1)(q-1)/4)=1,\ (x'=\max(x_p, x_q),\ y'=\max(y_p, y_q)) \quad (33)$$

$$X^e \equiv X \pmod{n} \quad (34)$$

As mentioned above, the Maurer judging method ensures safety of plain texts except for $2^{502}$ texts, and on the contrary, (Means 3b) of the present invention ensures that all the plain texts except for the four are strong texts against the iterated-encryption attack. Here, (Means 3b) generates prime numbers whose safety is higher than (Means 3a).

The following concretely describes embodiments of the present invention in reference to the drawings. In the following embodiments, the description will be given as to the case where a prime number secret key p of about 512 bits for RSA is generated.

Figure 6:
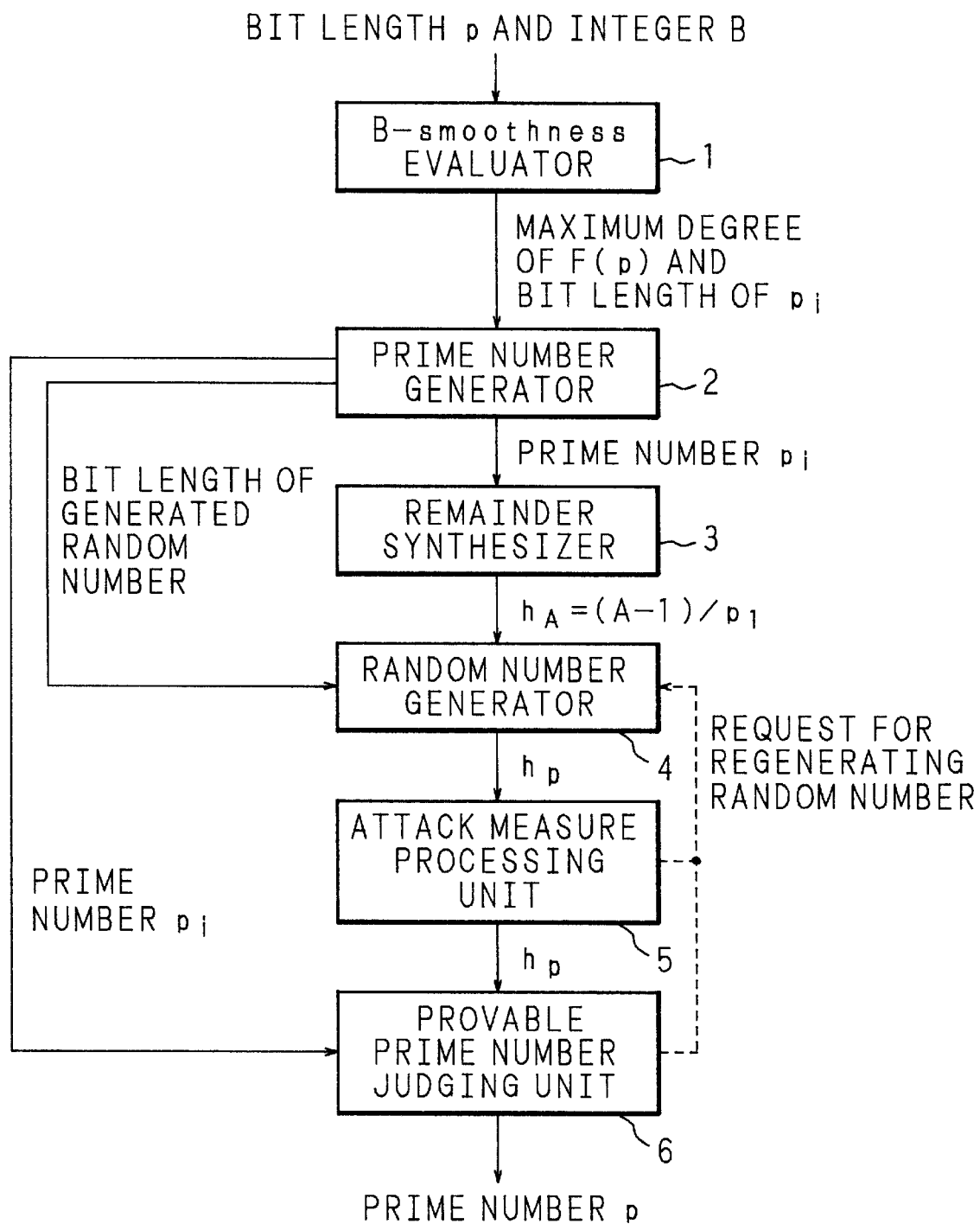
FIG. 6 is a block diagram showing the constitution of a prime number generation apparatus of the present invention.

FIG. 6 is a block diagram showing the constitution of the prime number generation apparatus of the present invention. The prime number generation apparatus of the present invention has a B-smoothness evaluator 1, a prime number generator 2, a remainder synthesizer 3, a random number generator 4, an attack measure processing unit 5 and a provable prime number judging unit 6. The B-smoothness evaluator 1 evaluates B-smoothness relating to t-order polynomial F(p) based on a bit length of p to be set and an integer B, and outputs a maximum order of F(p) to which a measure against the attack is taken and a bit length of a prime number $p_i$ to the prime number generator 2.

The prime number generator 2 generates a prime number $p_i$ according to the determined bit length and outputs it to the remainder synthesizer 3 and provable prime number judging unit 6 and outputs the bit length of a random number to the random number generator 4. The remainder synthesizer 3 obtains A using the Chinese remainder theorem, and calculates $h_{A=(A-1)}/p_1$ to output it to the random number generator 4. The random number generator 4 generates a random number according to the determined bit length, and obtains $h_p$ to output it to the attack measure processing unit 5. The attack measure processing unit 5 judges whether or not a prescribed condition is satisfied by the aforementioned (Means 3a) or (Means 3b), and takes a measure against the iterated-encryption attack. The provable prime number judging unit 6 judges whether or not the generated p is a prime number by the provable prime number judgment, and when judging that p is a prime number, outputs the prime number p.

Figure 7:
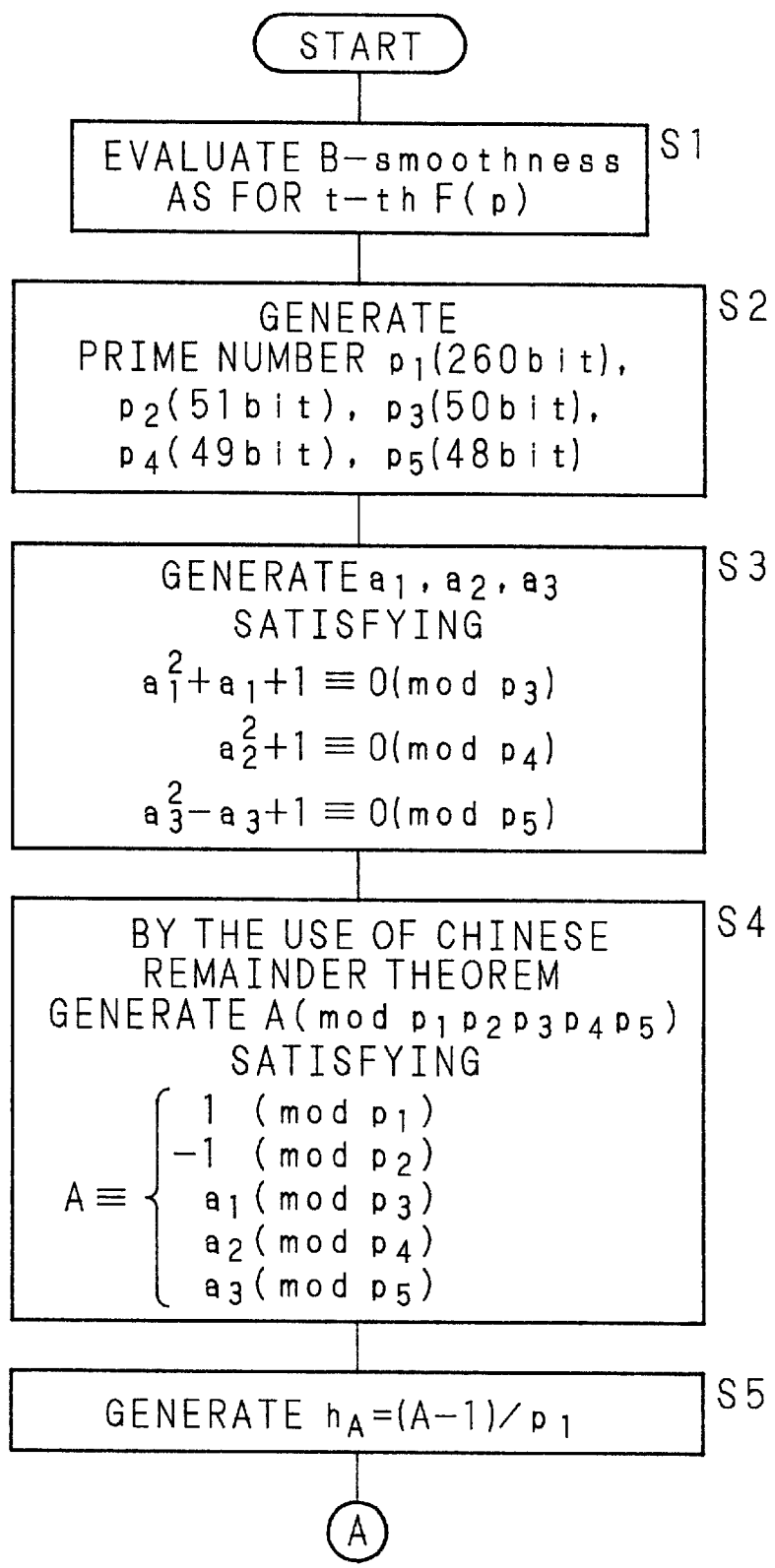
FIG. 7 is a flow chart showing a procedure of the prime number generation apparatus of the present invention.
Figure 8:
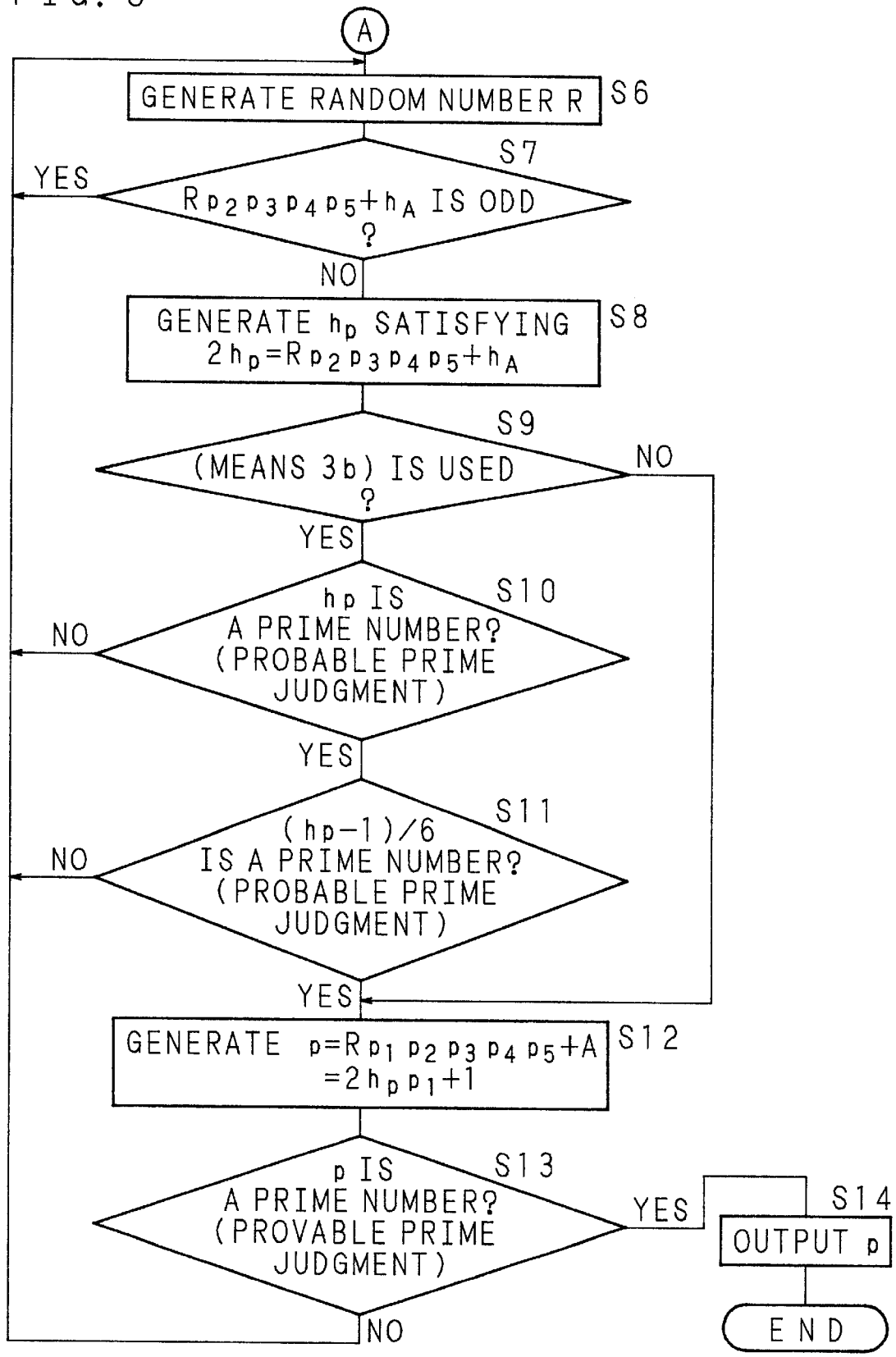
FIG. 8 is a flow chart showing a procedure of the prime number generation apparatus of the present invention.

FIGS. 7 and 8 are flow charts showing the whole procedure of the embodiment. First, the B-smoothness evaluator 1 evaluates B-smoothness relating to the t-order polynomial F(p) based on the bit length of p to be inputted and the value of B (S1). Assume that the bit length of p is 512 bits, and B is $2^{44}$, for example. As for the polynomial F(p) which is a factor of $(p^s-1)$, the maximum order to which a measure against the prime factorization is to be taken is determined. The evaluation result of F(p) using the aforementioned (Means 2) is shown in Table 1.

TABLE 1

| t-order polynomial F (p) | Computational complexity ratio | Probability of B-smooth |
| --- | --- | --- |
| p − 1 | 1 | $2^{-41}$ |
| p + 1 | 4 | $2^{-41}$ |
| $p^2 + p + 1$ | 9 | $2^{-105}$ |
| $p^2 + 1$ | 16 | $2^{-105}$ |
| $p^2 - p + 1$ | 36 | $2^{-105}$ |
| $p^4 + p^3 + p^2 + p + 1$ | 25 | $2^{-258}$ |
| $p^4 - p^3 + p^2 - p + 1$ | 100 | $2^{-258}$ | p: 512 bits
B = $2^{44}$

In Table 1, when F(p) is B-smooth, the computational complexity ratio shows a ratio of the computational complexity which is necessary for the prime factorization attack.

This means that when p+1 is B-smooth for example, the computational complexity of the attack necessary for p+1 method is four times as much as that of p−1 method is required.

When F(p) is B-smooth, the computational complexity necessary for the prime factorization attack is in proportion to B. Since F(p) whose order is not more than the second includes $p_i$ and is $p_i$-smooth, the computational complexity required for the attack using F(p) is in proportion to $p_i$. Moreover, when it is considered that the computational complexity required for the prime factorization attack against F(p) except for p−1 should be averaged, in view of the computational complexity in Table 1, since it is necessary to fulfill $p_2$: $p_3$: $p_4$: $p_5$:=8: 4: 2: 1, the bit length of $p_1$ is 260 bits, and the bit lengths of $p_2$, $p_3$, $p_4$ and $p_5$ are respectively 51 bits, 50 bits, 49 bits and 48 bits. As a result of the evaluation in Table 1, it is found that the order of F(p) in which the probability of B-smooth is not more than $1/p^{1/2}$ is not less than the fourth order. Therefore, it is evaluated that F(p) whose order is not less than the fourth-order cannot be B-smooth, and a measure is taken to F(p) whose order is not more than the second (so that a larger prime number is included).

Next, the prime numbers $p_1$ (corresponding to p−1: 260 bits), $p_2$ (corresponding to p+1: 51 bits), $p_3$ (corresponding to $p^2+p+1$: 50 bits), $p_4$ (corresponding to $p^2+1$: 49 bits) and $p_5$ (corresponding to $p^2-p+1$: 48 bits) are generated by the prime number generator 2 (S2). In this case, the Pocklington prime number judging method is used basically to adjust the bit length of $h_{pi}'$ in $p_i=2h_{pi}'pi'+1$, and thus the prime numbers $p_i$ is generated so that the determined bit lengths are obtained.

Figure 9:
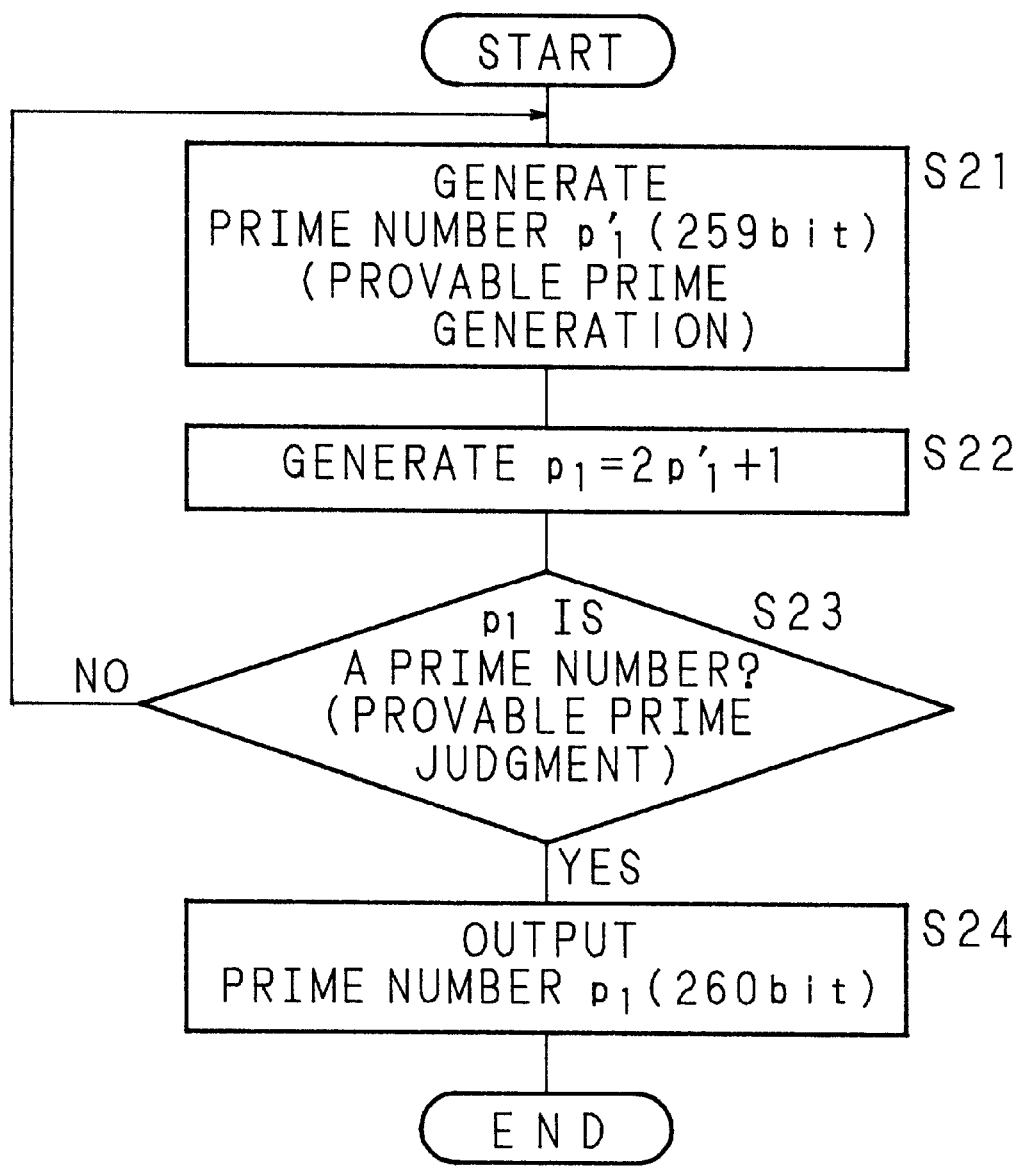
FIG. 9 is a flow chart showing a procedure for generating a prime number (generation of $p_1$) in the prime number generator.

FIG. 9 is a flow chart showing a procedure for generating prime number $p_1$ in the case where (Means 3a) or (Means 3b) is used. First, when (Means 3a) is used, prime number $p_1'$ of 259 bits is generated by the Pocklington prime number judging method (Maurer judging method) based on the encryption key e of RSA, and when (Means 3b) is used, prime number $p_1'$ of 259 bits is generated by the Pocklington prime number judging method (S21). Next, $p_1=2p_1'+1$ is generated (S22), and the Pocklington prime number judgment is made as for $p_1$ (S23). As a result, when the judgment is made that $p_1$ is a prime number (S23: YES), the prime number $p_1$ is outputted (S24). Meanwhile, when the judgment is not made that $p_1$ is a prime number (S23: NO), the sequence returns to S21 to regenerate a prime number $p_1'$. Here, when (Means 3a) and (Means 3b) are not used, the Pocklington prime number judging method is used to generate a prime number $p_1$ of 260 bits.

Figure 10:
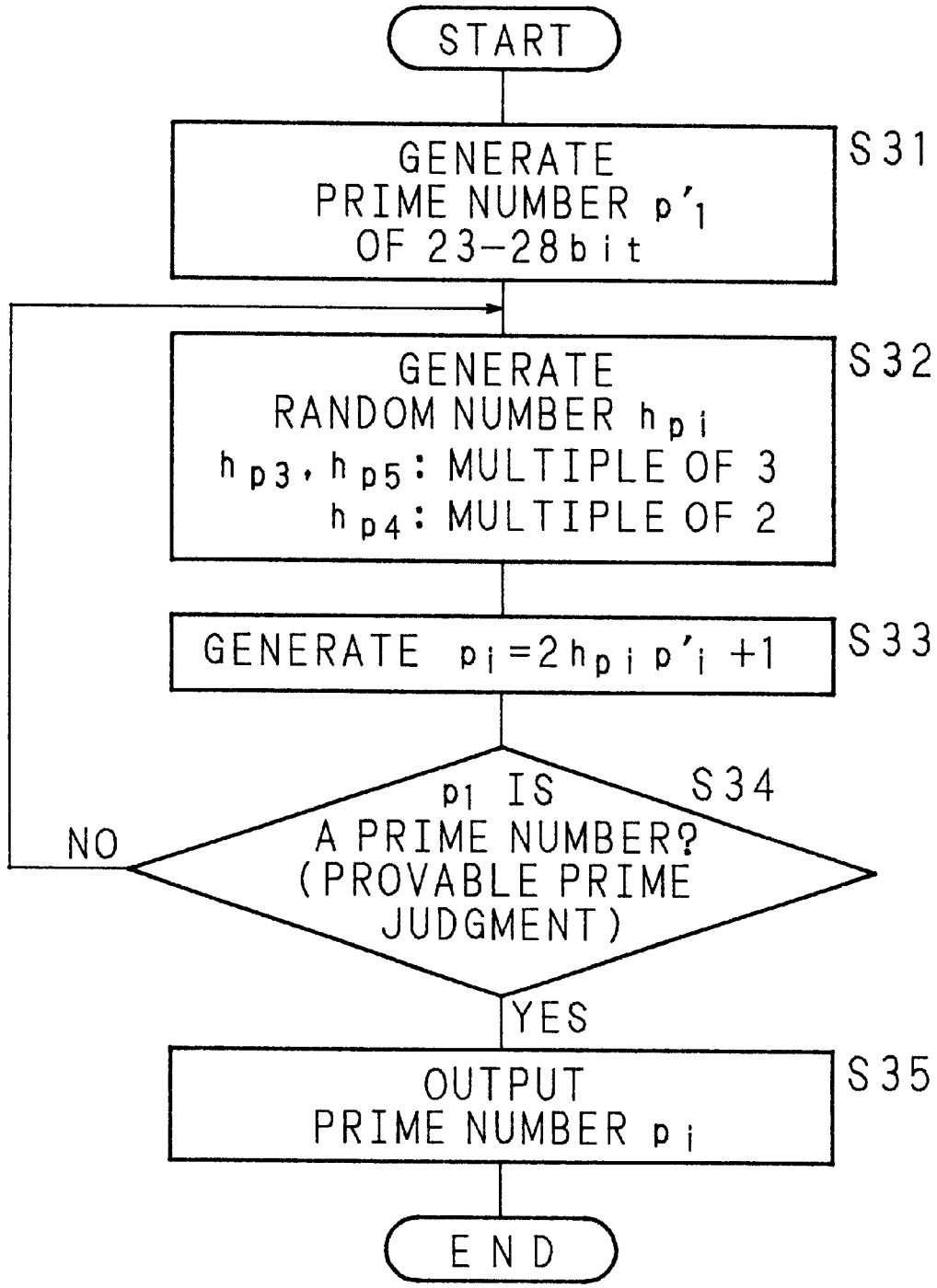
FIG. 10 is a flow chart showing a procedure for generating prime numbers (generation of $p_2$, $p_3$, $p_4$ and $p_5$) in the prime number generator.

FIG. 10 is a flow chart showing a procedure for generating $p_2$, $p_3$, $p_4$ and $p_5$. First, a complete prime number judgment (sieving method) is made as to whether or not $p_2$, $p_3$, $p_4$ and $p_5$ can be divided by small prime numbers of up to 14 bits so that prime numbers $p_i'$ of 23 through 28 bits are generated (S31). Next, random numbers $h_{p2}$, $h_{p3}$, $h_{p4}$ and $h_{p5}$ are generated correspondingly to $p_2$, $p_3$, $p_4$ and $p_5$ (S32). Here, $h_{p3}$ and $h_{p5}$ are multiples of 3, and $h_{p4}$ is a multiple of 2. Then, $p_i=2h_{pi}p_i'+1$ is generated (S33). At this time, $p_3=3k_3+1$, $p_4=4k_4+1$ and $p_5=6k_5+1$. The Pocklington prime number judgment is made as for the generated $p_i$ (S34). As a result, when the judgment is made that $p_i$ is a prime number (S34: YES), the prime number $p_i$ is outputted (S35). Meanwhile, when the judgment is not made that $p_i$ is a prime number (S34: NO), the sequence returns to S32 to regenerate a random number $h_{pi}$.

Next, $a_1 \equiv g_3^{(p3-1)/3}$, $a_2 \equiv g_4^{(p4-1)/4}$ and $a_3 \equiv g_5^{(p5-1)/6}$, which satisfy $a_1^2+a_1+1 \equiv 0$ (mod $p_3$), $a_2^2+1 \equiv 0$ (mod $p_4$) and $a_3^2-a_3+1 \equiv 0$ (mod $p_5$), are generated (S3). Here, $g_i$ is a primitive element of (mod $p_i$). A, which satisfies A≡1 (mod $p_1$), A≡−1 (mod $p_2$), A≡$a_1$ (mod $p_3$), A≡$a_2$ (mod $p_4$), and A≡$a_3$(mod $p_5$), is obtained by the Chinese remainder theorem (S4). Moreover, $h_A=(A-1)/p_1$ is calculated to be generated (S5). Here, the processes at S3, S4 and S5 are performed by the remainder synthesizer 3.

Thereafter, a random number R of 53 bits is generated (S6). A judgment is made as to whether or not $Rp_2p_3p_4p_5+h_A$ is an odd number (S7). When $Rp_2p_3p_4p_5+h_A$ is an odd number (S7: YES), the sequence returns to S6, and when $Rp_2p_3p_4p_5+h_A$ is an even number (S7: NO), $h_p=(Rp_2p_3p_4p_5+h_A)/2$ is calculated to generate $h_p$ (S8). Here, the processes at S6, S7 and S8 are performed by the random number generator 4.

When a measure against the iterated-encryption attack is taken by using (Means 3b) (S9: YES), a check is made as to whether or not the following three conditions (a) through (c) are satisfied by using the probable prime number judging method such as Miller-Rabin (S10 and S11).

(a) $h_p$ is a prime number.
(b) $h_p-1 \equiv 0$ (mod 6) and $(h_p-1)/6$ are prime numbers.
(c) $\gcd(e^6-1, (p-1)/2)=1$ When these conditions are satisfied (S10 and S11: YES), the sequence goes to S12, and when these conditions are not satisfied (S10 and S11: NO), the sequence returns to S6. Here, the processes at S9, S10 and S11 are performed by the attack measure processing unit 5.

Next, $p=2h_pp_1+1$ is generated (S12), and the generated p undergoes the Pocklington provable prime number judgment (S13). When the judgment is made that p is a prime number (S13: YES), the prime number p of 512 bits is outputted (S14), and the sequence is ended. Meanwhile, when the judgment is not made that p is a prime number (S13: NO), the sequence returns to S6. Here, the processes at S12, S13 and S14 are performed by the provable prime number judging unit 6.

In the aforementioned embodiment, p is 512 bits and B is $2^{44}$, but they are examples, so p and B are not limited to them. The result of evaluating F(p) using the (Means 2) when p is 1024 bits and B is $2^{50}$, for example, is shown in Table 2.

TABLE 2

| t-order polynomial F (p) | Computational complexity ratio | Probability of B-smooth |
|---|---|---|
| p − 1 | 1 | $2^{-89}$ |
| p + 1 | 4 | $2^{-89}$ |
| $p^2 + p + 1$ | 9 | $2^{-219}$ |
| $p^2 + 1$ | 16 | $2^{-219}$ |
| $p^2 - p + 1$ | 36 | $2^{-219}$ |
| $p^4 + p^3 + p^2 + p + 1$ | 25 | $2^{-520}$ |
| $p^4 - p^3 + p^2 - p + 1$ | 100 | $2^{-520}$ | p: 1024 bits
B = $2^{50}$

According to the example shown in Table 2, since a measure may be taken as for F(2) whose order is up to the second, the bit lengths of the prime numbers $p_1$, $p_2$, $p_3$, $p_4$ and $p_5$ which are allocated from the above polynomial are respectively 515 bits, 110 bits 109 bits, 108 bits and 107 bits in view of the computational complexity.

Here, by performing "trial division" in which $p_1$, $p_2$, $p_3$, $p_4$ and p5 are tried to be divided by a small prime number before the prime number judging routine in the flow charts shown in FIGS. 7 and 8, the efficiency of the process is improved. Moreover, when (Means 3b) is used, x'=y'=1 is set.

Figure 11:
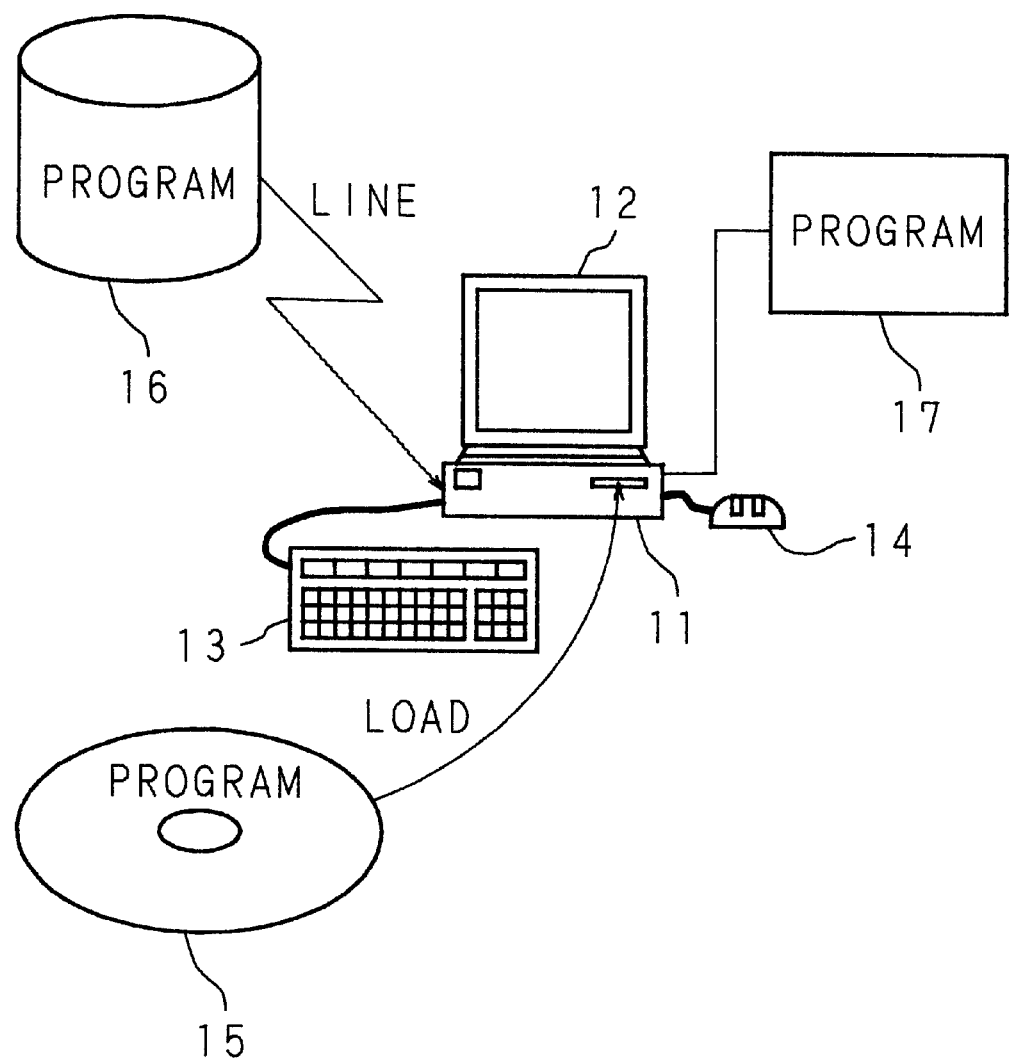
FIG. 11 is a drawing showing the constitution of a hardware system of the present invention.

FIG. 11 is a drawing showing the constitution of a hardware system of the present invention. The hardware has a personal computer 11 as a processing unit for generating prime numbers, a display 12 for displaying numerical data, etc., a keyboard 13 and mouse 14 as input units. The personal computer 11 loads programs for performing the aforementioned process of the present invention for generating prime numbers from a portable computer memory product 15 such as a magnetic disk and CD-ROM, from a lined memory 16 provided to a center, for example, which is capable of communicating programs with the personal computer 11 through a radio or cable, or from a computer memory product such as a RAM provided to the personal computer 11 and a memory 17 on the processing unit side such as a hard disk. Here, the recording medium shown in the claim of the present invention may be the portable computer memory product 15, the lined memory 16 or the memory 17 on the processing unit side.

The present invention produces the following excellent effects. Since the provable prime number judging method is used by (Means 1), a composite number is never generated, so a prime number can be surely generated. Since the criterion as to whether or not F(p) which is a factor of $p^s-1$ is B-smooth is introduced by (Means 2), an upper limit of an order of F(p), to which a measure against the prime factorization is required to be taken, can be determined. Since a larger prime number is given to F(p) whose order is not more than an order to which a measure should be taken, a measure against the prime factorization using an arbitrary F(p) can be taken.

Since as for larger prime number $P_1$ included in p-1, $p_1'$ which satisfies $p_1=2p_1'+1$ is a prime number according to (Means 3a), a prime number p, which is stronger against the iterated-encryption attack than the conventional method, can be generated. When $h_p$, $h_p'$, $p_1$ and $p_1'$ prime numbers under the conditions that $p=2h_p p_1+1$, $h_p=6h_p'+1$ and $p_1=2p_1'+1$, if $gcd(e^6-1, (p-1)(q-1)/4)=1$, a prime number p such that only four kinds of weak plain texts against the iterated-encryption attack exist can be generated.

Since bits of the prime numbers $p_2$, $p_3$, $p_4$ and $p_5$ included in F(p) are distributed slantly, the computational complexity required for the prime factorization attack can be uniformed in any F(p). Moreover, when (Means 3a) is used, since the Pocklington prime number judging method using a public encryption key e of RSA is used when the prime number $p_1$ is generated, the method which does not use e requires two steps: the step of generating $p_1$ by the Pocklington judging method using keys except for e; and the step of making the Maurer judgment using e relating as for $p_1$. On the contrary, in the prime number judging method using e according to the present invention, $p_1$ can be generated and at the same time e can be judged by the one step of generating $p_1$ by the Pocklington judging method using e.

When a prime number generated by the present invention in such a manner is used for a secret key of RSA, prime numbers whose security is higher than that in the conventional prime number generating method can be generated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A prime number generation apparatus for generating a prime number larger than a predetermined prime number by using one or a plurality of prime numbers and a random number, comprising:

means for generating a random number;

means for obtaining a prime number candidate by using the generated random number and one or a plurality of prime numbers;

means for judging as to whether or not the obtained prime number candidate is a prime number by using a provable prime number judging method;

means for taking a measure to at least three polynomials F(p) which are prime factors of $p^s-1$ (s: any arbitrary natural number which is set so that $p^s-1$ has at least three prime factors) by a prime number p against prime factorization for obtaining p and q from n when n=pq (p and q are prime numbers);

means for determining a maximum order of the polynomial F(p) to which a measure should be taken and means for giving a prime factor larger than a prescribed value to the polynomial F(p) whose order is not more than the determined order; wherein said means for determining includes means for determining the size of each prime number included in the polynomials F(p), according to computational complexity required for the prime factorization using the respective polynomials F(p) as for the polynomials F(p) to which a measure should be taken, and means for obtaining respective prime numbers according to the determined respective sizes, wherein when a prime number p of 512 bits is to be generated, p-1, p+1, $p^2+p+1$, $p^2+1$ and $p^2-p+1$ which are the polynomials F(p) to which a measure should be taken have prime factors of 260, 51 50, 49, 48 bit respectively.

2. A prime number generation apparatus for generating a prime number larger than a predetermined prime number by using one or a plurality of prime numbers and a random number, comprising:

means for generating a random number;

means for obtaining a prime number candidate by using the generated random number and one or a plurality of prime numbers;

means for judging as to whether or not the obtained prime number candidate is a prime number by using a provable prime number judging method;

means for taking a measure to at least three polynomials F(p) which are prime factors of $p^s-1$ (s: any arbitrary natural number which is set so that $p^s-1$ has at least three prime factors) by a prime number p against prime factorization for obtaining p and q from n when n=pq (p and q are prime numbers);

means for determining a maximum order of the polynomial F(p) to which a measure should be taken and means for giving a prime factor larger than a prescribed value to the polynomial F(p) whose order is not more than the determined order; wherein said means for determining includes means for determining the size of each prime number included in the polynomials F(p), according to computational complexity required for the prime factorization using the respective polynomials F(p) as for the polynomials F(p) to which a measure should be taken, and means for obtaining respective prime numbers according to the determined respective sizes, wherein when a prime number p of 1024 bits is to be generated, p-1, p+1, $p^2+p+1$, $p^2+1$ and $p^2-p+1$ which are the polynomials F(p) to which a measure would be taken have prime factors of 515, 110, 109, 108 and 107 bits, respectively.

3. A prime number generation apparatus for generating a prime number p used for a secret key of an RSA cryptosystem, comprising:

calculation means for calculating a prime number candidate by using one or a plurality of prime numbers and a random number;

prime number judging means for judging as to whether or not the calculated prime number candidate is a prime number by using a provable prime number judging method; and strength judging means for judging the strength of the number judged as a prime number against iterated-encryption attack on RSA cryptosystem, wherein said strength judging means includes means for judging as to whether or not the following conditions are satisfied when numbers p and q judged as prime numbers are represented by $p=2h_p p_1+1 (h_p<p_1, p_1:\text{prime number})$ and $q=2h_q q_1+1 (h_q<q_1, q_1:\text{prime number})$:

1. $p'_1$ and $q'_1$ which satisfy $p_1=2p'_1+1$ and $q_1=2q'_1+1$ are prime numbers:
2. $h_p$ and $h_q$ are prime numbers;
3. as for $x_p, y_p, x_q, y_q \geq 1$ prime numbers $h'_p$ and $h'_q$ which satisfy $h_p=2^{x_p}3^{y_p}h'_p+1, h_q=2^{x_q}3^{y_q}h'_q+1$ exist; and
4. As for an encryption key e of RSA cryptosystem, $gcd(e^{2x'3y'}-1,(p-1)(q-1)/4)=1$ holds;

here, $x'=\max(x_p,x_q), y'=\max(y_p,y_q)$.

4. A prime number generation apparatus comprising:

means for taking a measure to at least three polynomials F(p) against respective prime factorization methods for obtaining prime numbers p and q from a composite number n=pq, in which each polynomial F(p) indicated by a prime factor of $p^s-1$ (s: any arbitrary natural number which is set so that $p^s-1$ has at least three prime factors) is a product of prime numbers not larger than a prescribed number; and means for determining the bit length of a prime number to be given to F(p) in view of a difference in the computational complexity required for the respective prime factorization methods, when the respective polynomials F(p) except for p−1 have prime factors of the same bit length.

5. The prime number generation apparatus of claim 4, further comprising:

calculation means for calculating a probability that a prime factor of polynomial F(p) does not exceed a first prescribed value; and judging means for judging that a measure should be taken to deal with a polynomial F(p) in which the calculated probability exceeds a second prescribed value.

6. The prime number generation apparatus of claim 5, wherein said calculation means further comprises:

first means for calculating the number of values composed of the product of prime numbers not larger than the first prescribed value included in the range of polynomial F(p) which is determined according to the range into which the prime number p falls; and second means for calculating a probability that a prime factor of polynomial F(p) does not exceed the first prescribed value by dividing the number that is calculated by said first means by $F(p_{max})-F(p_{min})$.

7. A prime number generation apparatus of claim 5, wherein the second prescribed value is $1/p^{0.5}$.

8. A computer readable storage medium, storing a program to instruct a computer to perform:

taking a measure to at least three polynomials F(p) against respective prime factorization methods for obtaining prime numbers p and q from a composite number n=pq, in which each polynomial F(p) indicated by a prime factor of $p^s-1$ (s: any arbitrary natural number which is set so that $p^s-1$ has at least three prime factors) is a product of prime numbers not larger than a prescribed number; and determining the bit length of a prime number to be given to F(p) in view of a difference in the computational complexity required for the respective prime factorization methods, when the respective polynomials F(p) except for p−1 have prime factors of the same bit length.

9. The computer readable storage medium recited in claim 8, further performing:

calculating a probability that a prime factor of polynomial F(p) does not exceed a first prescribed value; and judging that a measure should be taken to deal with a polynomial F(p) in which the calculated probability exceeds a second prescribed value.

10. The computer readable storage medium recited in claim 9, wherein said calculating further comprises:

calculating the number of values composed of the product of prime numbers not larger than the first prescribed value included in the range of polynomial F(p) which is determined according to the range into which the prime number p falls; and calculating a probability that a prime factor of polynomial F(p) does not exceed the first prescribed value by dividing the number that is calculated by said first means by $F(p_{max})-F(p_{min})$.

11. The computer readable storage medium recited in claim 9, wherein the second prescribed value is $1/p^{0.5}$.

12. A method comprising:

taking a measure to at least three polynomials F(p) against respective prime factorization methods for obtaining prime numbers p and q from a composite number n=pq, in which each polynomial F(p) indicated by a prime factor of $p^s-1$ (s: any arbitrary natural number which is set so that $p^s-1$ has at least three prime factors) is a product of prime numbers not larger than a prescribed number;

determining the bit length of a prime number to be given to F(p) in view of a difference in the computational complexity required for the respective prime factorization methods, when the respective polynomials F(p) except for p−1 have prime factors of the same bit length; and using the determining in order to improve encryption security.

13. The method recited in claim 12, further performing:

calculating a probability that a prime factor of polynomial F(p) does not exceed a first prescribed value; and judging that a measure should be taken to deal with a polynomial F(p) in which the calculated probability exceeds a second prescribed value.

14. The method recited in claim 13, wherein said calculating further comprises:

calculating the number of values composed of the product of prime numbers not larger than the first prescribed value included in the range of polynomial F(p) which is determined according to the range into which the prime number p falls; and calculating a probability that a prime factor of polynomial F(p) does not exceed the first prescribed value by dividing the number that is calculated by said first means by $F(p_{max})-F(P_{min})$.

15. The method recited in claim 13, wherein the second prescribed value is $1/p^{0.5}$.

16. A prime number generation apparatus comprising:

means for taking a measure to at least three polynomials F(p) against respective prime factorization methods for obtaining prime numbers p and q from a composite number n=pq, in which each polynomial F(p) indicated by a prime factor of $p^s-1$ (s: any arbitrary natural number which is set so that $p^s-1$ has at least three prime factors) is a product of prime numbers not larger than a prescribed number;

said means including:

a first means for calculating an evaluation value for probability that the prime factor of F(p) does not exceed a first prescribed value determined in advance, by carrying out a first step of calculating, from the equation $v=(F(p_{max})-F(p_{min}))*\exp(-u\ln(u))$, the number v of natural numbers included in a range having prime factors smaller than the first prescribed value in which $p_{max}$ and $p_{min}$ are the maximum value and the minimum value of p respectively, $u=t*p_b/\log_2 B$ holds and t is the order of the polynomial F(p), $p_b$ is the bit length of the prime number p to be generated and B is the first prescribed value, and by carrying out a second step of calculating $v/(p_{max}-p_{min})$ to obtain an evaluation value for probability; and a second means for taking a measure against F(p) whose obtained evaluation value for probability exceed a second prescribed value determined in advance.

17. The prime number generation apparatus of claim 16, wherein the second prescribed value is $1/p^{0.5}$.

18. A prime number generation method comprising:

taking a measure to at least three polynomials F(p) against respective prime factorization methods for obtaining prime numbers p and q from a composite number n=pq, in which each polynomial F(p) indicated by a prime factor of $p^s-1$ (s: any arbitrary natural number which is set so that $p^s-1$ has at least three prime factors) is a product of prime numbers not larger than a prescribed number;

said taking a measure including:

calculating an evaluation value for probability that the prime factor of F(p) does not exceed a first prescribed value determined in advance, by carrying out a first step of calculating, from the equation $v=(F(p_{max})-F(p_{min}))*\exp(-u\ln(u))$, the number v of natural numbers included in a range having prime factors smaller than the first prescribed value in which $p_{max}$ and $p_{min}$ are the maximum value and the minimum value of p respectively, $u=t*p_b/\log_2 B$ holds and t is the order of the polynomial F(p), $p_b$ is the bit length of the prime number p to be generated and B is the first prescribed value, and by carrying out a second step of calculating $v/(p_{max}-p_{min})$ to obtain an evaluation value for probability; and taking a measure against F(p) whose obtained evaluation value for probability exceed a second prescribed value determined in advance.

19. The prime number generation method of claim 16, wherein the second prescribed value is $1/p^{0.5}$.

20. A computer readable storage medium storing a program to perform a prime number generation method, said program performing:

taking a measure to at least three polynomials F(p) against respective prime factorization methods for obtaining prime numbers p and q from a composite number n=pq, in which each polynomial F(p) indicated by a prime factor of $p^s-1$ (s: any arbitrary natural number which is set so that $p^s-1$ has at least three prime factors) is a product of prime numbers not larger than a prescribed number;

said taking a measure including:

calculating an evaluation value for probability that the prime factor of F(p) does not exceed a first prescribed value determined in advance, by carrying out a first step of calculating, from the equation $v=(F(p_{max})-F(p_{min}))*\exp(-u\ln(u))$, the number v of natural numbers included in a range having prime factors smaller than the first prescribed value in which $p_{max}$ and $p_{min}$ are the maximum value and the minimum value of p respectively, $u=t*p_b/\log_2 B$ holds and t is the order of the polynomial F(p), $p_b$ is the bit length of the prime number p to be generated and B is the first prescribed value, and by carrying out a second step of calculating $v/(p_{max}-p_{min})$ to obtain an evaluation value for probability; and taking a measure against F(p) whose obtained evaluation value for probability exceed a second prescribed value determined in advance.

21. The computer readable storage medium of claim 20, wherein the second prescribed value is $1/p^{0.5}$.

* * * * *